(12) United States Patent
Almog et al.

(10) Patent No.: US 7,248,661 B1
(45) Date of Patent: Jul. 24, 2007

(54) DATA TRANSFER BETWEEN PHASE INDEPENDENT CLOCK DOMAINS

(75) Inventors: Edan Almog, Herzlia (IL); Henri Meirov, Tel Aviv (IL)

(73) Assignee: Analog Devices, Inc., Norwood, MA (US)

( * ) Notice: Subject to any disclaimer, the term of this patent is extended or adjusted under 35 U.S.C. 154(b) by 729 days.

(21) Appl. No.: 10/649,249

(22) Filed: Aug. 26, 2003

(51) Int. Cl.
*H04L 7/00* (2006.01)
(52) U.S. Cl. .................. 375/358; 375/372; 370/516; 327/142; 327/162; 711/105; 711/111; 711/154; 711/167
(58) Field of Classification Search ............. 375/354, 375/358, 372; 370/503, 516; 327/142, 162; 711/100, 105, 111, 150, 154, 157, 167
See application file for complete search history.

(56) References Cited

U.S. PATENT DOCUMENTS

| | | | |
|---|---|---|---|
| 4,054,744 A | 10/1977 | Beaman | |
| 4,949,361 A | 8/1990 | Jackson | |
| 5,537,557 A | 7/1996 | Briffett et al. | |
| 5,905,766 A * | 5/1999 | Nguyen | 375/354 |
| 6,075,831 A | 6/2000 | Schnizlein et al. | |
| 6,088,412 A | 7/2000 | Ott | |
| 6,118,835 A | 9/2000 | Barakat et al. | |
| 6,728,828 B2 * | 4/2004 | Hashimoto et al. | 711/105 |
| 2002/0176512 A1 | 11/2002 | Tanaka et al. | |
| 2003/0081713 A1 | 5/2003 | Pontius et al. | |
| 2003/0123588 A1 * | 7/2003 | Parikh | |
| 2004/0078774 A1 * | 4/2004 | Goko | |

* cited by examiner

*Primary Examiner*—Dac V. Ha
(74) *Attorney, Agent, or Firm*—Wolf, Greenfield & Sacks, P.C.

(57) ABSTRACT

An integrated circuit arrangement clocked by a single clock having variable delays to different regions of said arrangement such that said regions are partially synchronized to each other, the arrangement comprising: a data transfer buffer for buffering a data stream for transfer between respective first and second ones of said regions, and a data transfer controller, associated with said data transfer buffer and said respective regions, configured to control transfer of said data stream by: initially synchronizing between said respective regions at a start of said data stream, receiving data, in said buffer, from said first region, at a predetermined rate, and outputting said data stream to said second region at said predetermined rate in accordance with said initial synchronization. The arrangement allows deterministic data patterns to arrive at the receiving domain at minimal hardware cost.

28 Claims, 5 Drawing Sheets

DATA TRANSFER BETWEEN PHASE INDEPENDENT CLOCK DOMAINS

FIELD AND BACKGROUND OF THE INVENTION

The present invention relates to data transfer between phase independent clock domains and, more particularly, but not exclusively to a method or apparatus for deterministic data transfer between commonly clocked domains wherein an exact or variable phase difference is introduced by such factors as the circuit geometry.

The trend today in silicon chip design is towards VLSI, and with larger and larger chips, smaller and smaller features and higher and higher clock rates, the result is that different regions on the chip can no longer be relied upon to be in time with a common clock. Even if the entire chip is commonly clocked, phase differences at different areas of the chip mean that interactions such as data transfer between one area and the other may require additional synchronization.

More specifically, in the current art, the transfer of data between two logic sections located at relatively large distance from each other, typically entails the utilization of one of the following techniques:
Creating a single controlled clock-domain covering the physical location of both logic sections;
Creating two controlled clock-domains with a known controlled phase relationship, and utilizing a known synchronization technique; and
Creating two phase-independent clock-domains and utilizing a known synchronization technique incorporating a synchronization FIFO. Essentially the FIFO allows the data being transferred to be buffered until the transmitting domain indicates to the receiving domain via the synchronization technique that the buffered data is ready. A disadvantage with the FIFO approach is that it results in a non-deterministic output data pattern.

The first two techniques may prove strenuous or impractical in some cases, while the third is hampered by the non-deterministic output data pattern. A deterministic data output pattern is required inter alia for chip testing. A chip, or arrangement of chips, that does not produce a deterministic output pattern can be difficult to test.

Examples of prior art include the following US patents and applications: U.S. Pat. No. 6,118,835, Apparatus and method of synchronizing two logic blocks operating at different rates, U.S. Pat. No. 5,905,766, Synchronizer, method and system for transferring data, U.S. Pat. No. 5,537,557, Interface between unsynchronized devices, U.S. Pat. No. 4,949,361 Digital data transfer synchronization circuit and method, U.S. Pat. No. 6,088,412 Elastic buffer to interface digital systems, U.S. Pat. No. 6,075,831 FIFO and system synchronization system and method, U.S. Pat. No. 5,905,766 Synchronizer, method and system for transferring data, U.S. Pat. No. 4,054,744 Data buffer, US-A 2003/0081713 Clock domain crossing FIFO, and US-A 2002/0176512 data transfer device.

There is thus a widely recognized need for, and it would be highly advantageous to have, a technique for data transfer between two relatively distant domains which overcomes the problem of an undetermined, possibly variable phase difference in the synchronization of the domains.

SUMMARY OF THE INVENTION

According to one aspect of the present invention there is provided a method of transferring a multi-word data stream between a first electronic component region and a second electronic component region, the multi-word data stream having a start and a continuation, the component regions being clocked such as to have a frequency ratio therebetween variable about an average value, and a maximum mutual jitter between the two clocks, the method comprising:
outputting the start from the first component region,
outputting a synchronization signal to indicate timing of outputting of the start,
outputting the continuation from the first electronic component region at a first predetermined rate,
buffering the data stream including the start and the continuation,
using the synchronization signal to establish an initial synchronization with the second electronic component region,
outputting the buffered start of the data stream to the second electronic component region in accordance with the initial synchronization, and
outputting the continuation to the second electronic component region at substantially the first predetermined rate, at timings dictated by the initial synchronization.

In an embodiment, the outputting of the synchronization signal is substantially together with the outputting of the start.

Alternatively, the outputting of the synchronization signal is delayed by a predetermined number of clock cycles following outputting of the start, the predetermined number being selected to allow at least partial filling of the buffer. In an embodiment, the component regions are both clocked using signals derived from a single clock on a third electronic component region.

The method may comprise inserting blank data within the continuation to extend the continuation and retain validity of the initial synchronization.

The method may comprise adding control flags to the data stream to indicate a blank or valid status of the data in the stream.

The method may comprise deriving the synchronization signal from a clock signal of the first region.

In an embodiment, the using of the synchronization signal to establish an initial synchronization comprises transferring the synchronization signal to the second region, waiting for a next rising or falling edge of a second region clock signal and issuing a synchronization acknowledge signal.

The method may comprise waiting after the initial synchronization before the outputting of the buffered start, thereby to establish buffering margins to cover variations in synchronization between the first and the second regions.

In an embodiment, the buffering margins have a minimum length of the predetermined rate multiplied by the maximum mutual jitter.

Additionally or alternatively, the buffering margins are substantially equal in size to or larger than the predetermined rate multiplied by the maximum mutual jitter.

In one embodiment, the first and the second electronic component regions are regions of a single integrated circuit.

Alternatively, the first and the second electronic component regions are separate integrated circuits clocked from a common originating clock signal.

According to a second aspect of the present invention there is provided an arrangement comprising at least one integrated circuit, the arrangement being clocked by at least one signal obtained from a single clock having variable delays to different regions of the arrangement such that the regions are partially synchronized to each other, having a mutual clock frequency ratio therebetween which varies about an average value and a maximum mutual clock jitter, the arrangement comprising:

a data transfer buffer for buffering parts of multi-word data streams during transfer between respective first and second ones of the regions, and data transfer control functionality, associated with the data transfer buffer and the respective regions, configured to control transfer of the data stream, the functionality comprising:

synchronizing logic for detecting at least a start of transfer of the multi-word data stream, issuing a synchronizing signal based on timing at the first region, and using the synchronizing signal to form an initial synchronization with the second region, and rate control logic for receiving data of the multi-word data stream, in the buffer, from the first region, at a predetermined rate, the data transfer control functionality being operable to withhold forwarding of the data stream from the buffer to the second region by at least a synchronizing delay indicated by the initial synchronization, the rate control logic further being configured to carry out the forwarding to the second region at substantially the predetermined rate.

In an embodiment, the first region comprises synchronization retention functionality to support insertion of blank data into the data stream to extend the data stream, thereby to retain validity of the initial synchronization.

In an embodiment, the synchronization retention functionality comprises functionality to insert control flags into the data stream to indicate at least one of the blank data and valid data.

In an embodiment, the initial synchronization comprises sending the synchronization signal from the first region to the second region simultaneously with outputting of a start of the data stream from the first region.

In an embodiment, the data transfer buffer comprises a FIFO stack.

In an embodiment, the first and the second regions are located on a single integrated circuit.

In an embodiment, the single integrated circuit comprises very large scale integration (VLSI).

In an embodiment, the synchronization signal is a derivation of a first region clock signal.

In an embodiment, the synchronizing logic comprises logic associated with the second region for producing a synchronize acknowledgement at a first rising or falling edge of a second region clock signal following receipt of the synchronizing signal.

In an embodiment, the buffer is configured to introduce a forwarding delay following receipt of the synchronize acknowledgement before forwarding the data stream to the second region.

In an embodiment, the buffer comprises a plurality of buffer units to buffer variable amounts of data, the forwarding delay being selected to leave margins within the buffer both for transient increasing and decreasing of a buffer storage level, thereby to cushion transient changes due to a mutual clock jitter relationship between said regions.

In an embodiment, the forwarding delay is selected such as to render the margins substantially equal in size.

In an embodiment, the forwarding delay and a number of the buffer units are selected such as to provide a margin size at least equal to the predetermined rate multiplied by a maximum of the mutual clock jitter.

In an embodiment, the forwarding delay and a number of the buffer units are selected such as to provide a margin size substantially equal to the predetermined rate multiplied by a maximum of the mutual clock jitter.

According to a third aspect of the present invention there is provided a method for transferring a stream of data between a first region and a second region, the regions clocked from a commonly originating clock signal such that a clock frequency ratio variable about an average value is established between the regions, the method comprising:

buffering the data stream from the first region at a predetermined rate, initially synchronizing with the second region, and outputting the buffered data to the second region continually at the predetermined rate according to the initial synchronization.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments provide deterministic data transfer between two logic domains located relatively far from each other, "relatively far" meaning that the relative distance between the domains is such that synchronization between the domains is unreliable or not constant. The preferred embodiments are relatively simple in their implementation compared to the prior art systems discussed above.

The principles and operation of deterministic data transfer according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
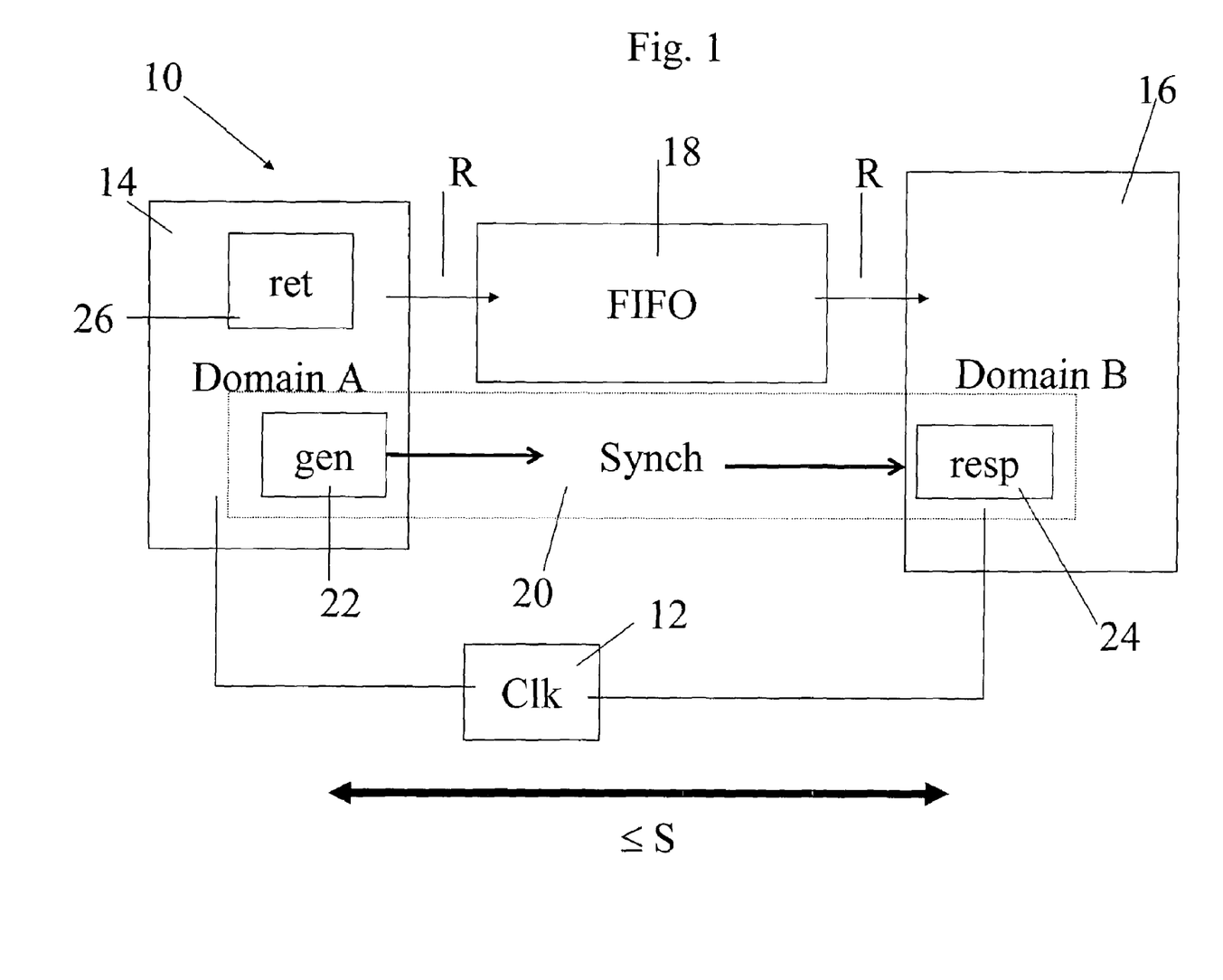
FIG. 1 is a simplified schematic diagram illustrating two regions or domains and data transfer logic for transferring data streams therebetween according to a first preferred embodiment of the present invention.

Referring now to the drawings, FIG. 1 illustrates an integrated circuit arrangement 10, which may be a single integrated circuit (IC) or may be two or more ICs. The arrangement is preferably clocked by a single clock 12 having variable delays to different regions of the arrangement, resulting in the regions being only partially synchronized to each other. In general "partially synchronized" in the present context means in practice that one of the regions lags the other by a certain delay, and that the value of that delay fluctuates about an average value. The delay may be due to a number of factors, including differences in the lengths of the lines from the clock to the respective regions and different stray capacitances and inductances encountered on the lines. The effect is particularly noticeable with high feature densities and relatively large ICs and high clock rates such as in VLSI. In such circumstances a need arises to synchronize when transferring data streams from one region to another as for example between domain A, 14, and domain B, 16, in FIG. 1. The need to synchronize is especially important when time and like relationships within the signals are required at the output, that is to say when a deterministic output data pattern is required. Deterministic output patterns are useful, for example, for chip integrity testing.

An arrangement for providing deterministic output data according to a first embodiment of the present invention comprises a data transfer buffer 18 for buffering a data stream for transfer between the two regions. The buffer 18 may conveniently be implemented as a FIFO stack, and, if data is transferred at a rate R and a maximum mutual clock jitter between the two regions is S, then a minimum capacity of the buffer 18 is preferably S*R. Preferably the buffer has additional capacity of at least S*R beyond the used capacity at the instant data readout begins.

The arrangement preferably additionally comprises data transfer control logic 20, associated with both the data transfer buffer 18 and the respective regions. Logic 20 preferably comprises a synchronization signal generator 22, associated with domain A 14, and a synchronization response unit 24 associated with domain B, 16.

Figure 2:
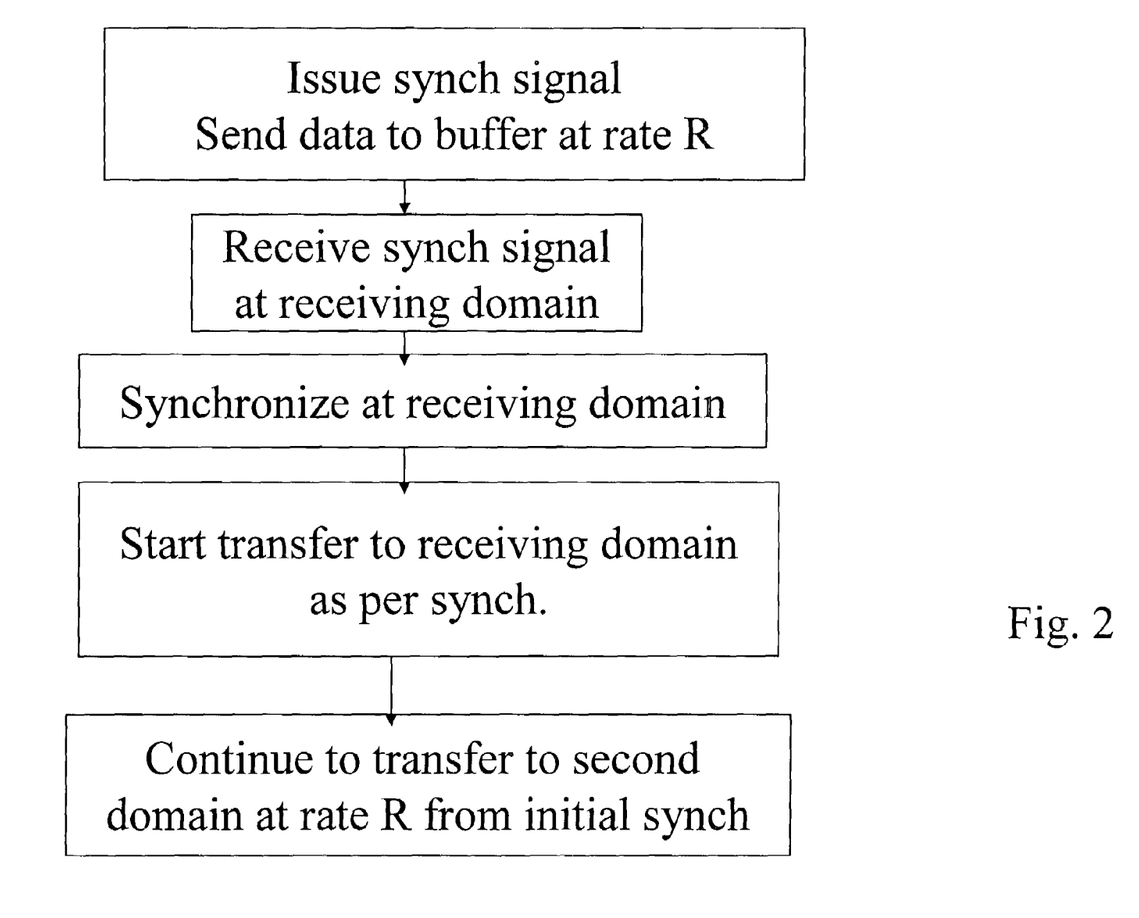
FIG. 2 is a simplified flow chart showing operation of the data transfer logic of FIG. 1.

Operation of the data transfer control logic is illustrated in FIG. 2, which is a simplified flow chart of the synchronization and data transfer process. Operation comprises initially producing a synchronization signal at the generator 22 and issuing it at the same time as commencing data transfer from the first domain to buffer 18. The synchronization signal is received by the second domain 16 which uses it to synchronize with its clock in one of several ways known to the skilled person, for example via synchronization response unit 24. The synchronization response unit 24 preferably receives the synchronization signal, waits for the correct phase of its local clock, and then issues a synchronization acknowledgement signal to indicate to the buffer that it may commence data transfer. The wait for the correct phase of the local clock overcomes any phase difference between the two domains. The buffer uses the synchronization acknowledge signal to begin transferring data to the second domain at rate R. As will be explained below, data transfer is not necessarily commenced immediately but the buffer may be preprogrammed to wait a certain number of clock cycles before commencing. Because the second domain has a clock rate which is partially synchronized with the first domain, the data transfer rate R can be sustained without requiring regular resynchronization during the course of the data transfer. Temporary wavering about the average delay at either of the domains merely results in temporary increases or decreases in the contents of the buffer. The control logic may incidentally continue to produce synchronization signals but any synchronization signals beyond the initial signal do not control the data transfer to the second domain.

Figure 3:
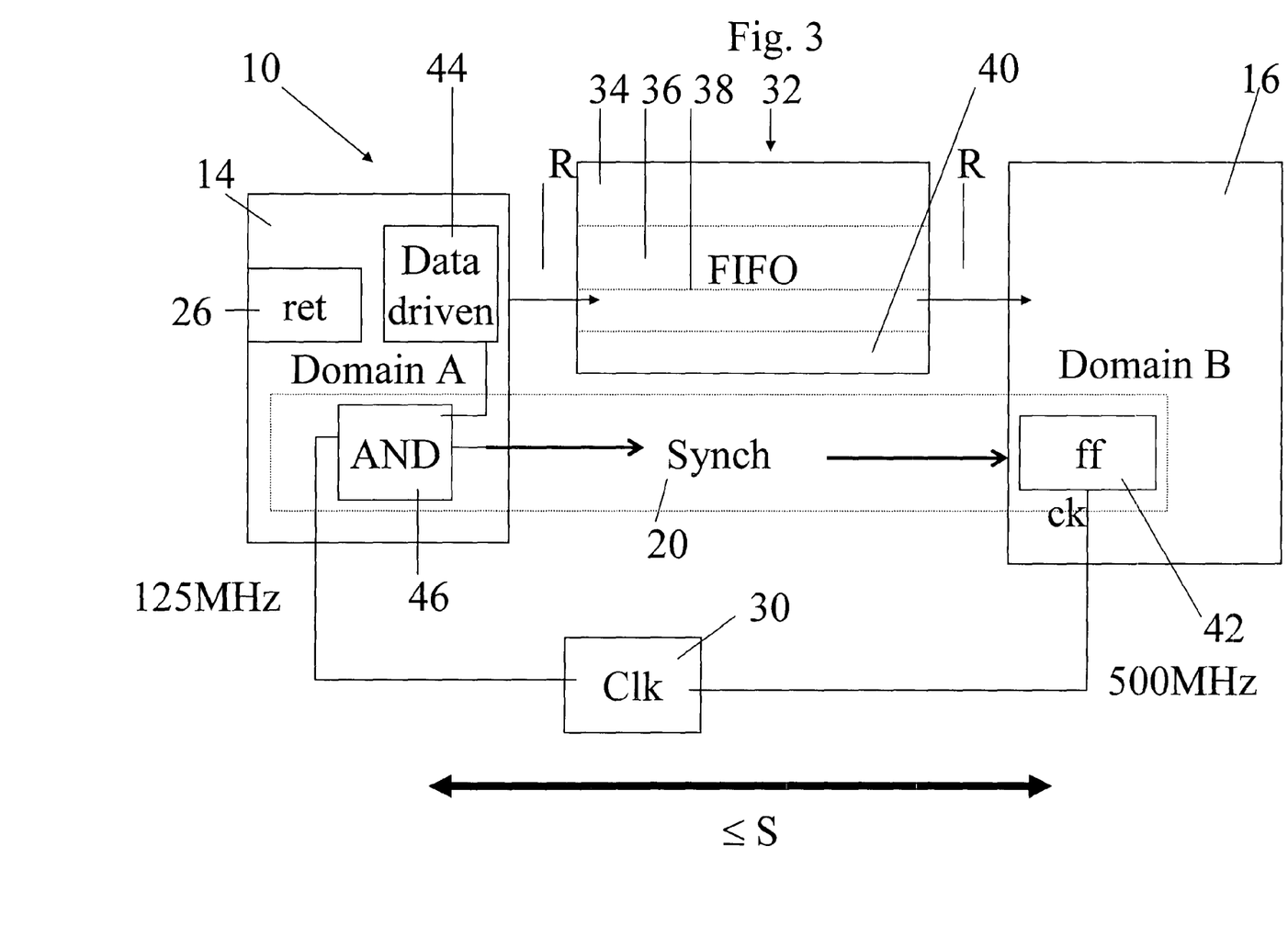
FIG. 3 is a simplified block diagram showing the apparatus of FIG. 1 in greater detail.

Reference is now made to FIG. 3, which is a block diagram showing a more detailed version of the device 10 of FIG. 1. In FIG. 3, two domains A and B are clocked at different rates using signals derived from a single parent clock 30. Specifically region A is clocked at 125 MHz and region B is clocked at 500 MHz. The two regions are interfaced by a FIFO 32 which comprises four synchronization word units 34, 36, 38 and 40, each capable of buffering a word of the data being transferred. Data is transferred from clock-domain A to clock-domain B, and there is no control of the phase relation between the two clocks, for reasons including those outlined hereinabove. With each phase of clock A, a 32-bit data word, accompanied by an additional 'data-valid' bit is driven, and latched by clock A into one of the four synchronization FIFO word units 32-40. As discussed above, the data-valid bit serves only to indicate data validity and has no connection to timing issues. The first word of data is preferably driven adjacent to a clock A falling edge. In addition, a synchronization control signal is driven by clock-domain A. In the present embodiment the synchronization signal is taken directly from A's clock signal itself by selecting the first rising edge of the clock signal after the first data word is driven. One way of obtaining such a signal is to provide an AND gate 44, to AND A's clock with a signal indicating that the data word has been driven. The signal indicating that the data word has been driven may be issued by a data driven unit 46 connected either to the output of the A domain or to the input of the buffer. It is noted that a data driven signal is typically output whenever data is output and not just at the start of the data stream. Consequently the synchronization signal will be output throughout the process of transfer of the data stream. However, in accordance with the present embodiments, the synchronization signal is ignored after synchronization is first achieved for any given data stream.

The synchronization signal is sampled by a low-MTBF flip-flop 42, that is a flip-flop designed for an extremely low chance of meta-stability, in clock-domain B. FF 42 is clocked by B to latch at the rising edge so that the synchronization signal is sampled at the rising edge of clock B, hence defining precisely the phase difference currently in effect between A and B. Currently the buffer 32 holds only one word of data and thus there is no margin for variation in the phase difference between the two domains. Thus, in order to maintain maximal FIFO overrun and underrun margins, clock-domain B preferably does not start reading bytes from the synchronization FIFO until a predetermined delay has passed after the first synchronization signal edge is detected, allowing the buffer to fill half way. Thus, in the example of the four word unit FIFO shown in the figure, if reading commences when two units are full, then there is a two unit margin for overrun and a two unit margin for underrun. By contrast if reading were to start directly, after the first word had been received, then there would be a three-unit margin for overrun but only a one unit margin for underrun. As discussed above, a preferred minimal margin size is S*R where data is transferred at rate R and S is the maximum clock difference between the two regions. The FIFO is subsequently written and read cyclically at the same rate continuously regardless of the synchronization signal.

Figure 4:
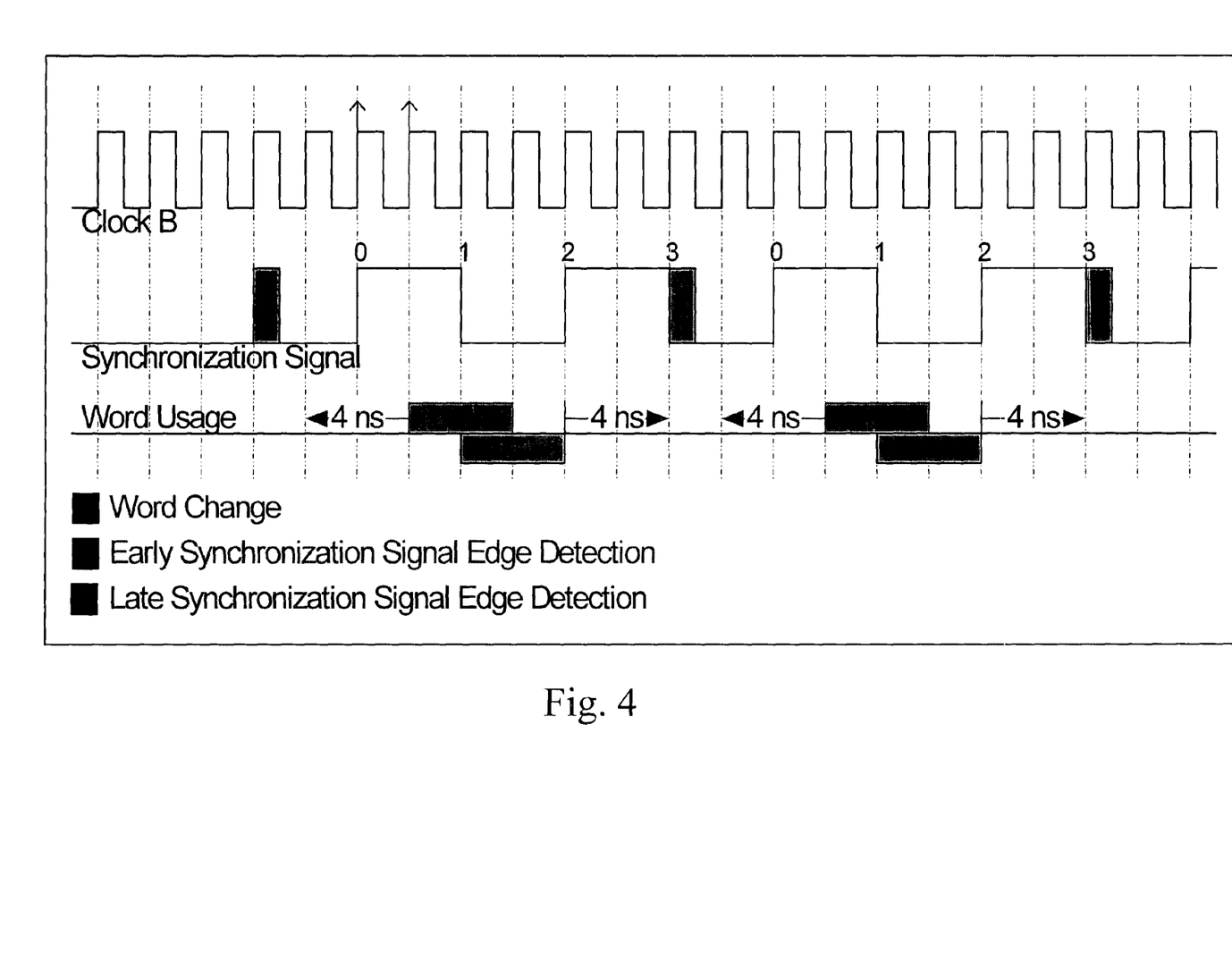
FIG. 4 is a simplified timing diagram illustrating timing waveforms for a first unit within the buffer of FIG. 3.

Reference is now made to FIG. 4 which is a waveform timing diagram illustrating data transfer using the embodiment of FIG. 3. Three traces are shown of which the uppermost trace is clock B. The middle trace is the synchronization signal derived from clock A, upon which the transitions of the word-unit are depicted, and the lowermost trace indicates word take-up or usage at region B. The word take up shows both an earliest and a latest word take up scenario. The two scenarios demonstrate a race condition between the synch signal rising edge and clock B rising edge. The relative position between the transitions of both signals demonstrated in the waveform is specifically chosen to demonstrate the race condition, as the synch edge can come at any time relative to the clock edge. If the clock edge comes slightly before the synch edge, than the synch is sampled late, that is at the next cycle. If the clock edge comes slightly behind the synch edge, then the synch is sampled early.

The timing diagram focuses on the first unit, 34, of the four word-units of the synchronization FIFO, and depicts changes at and uptake of data directly from that word-unit only, disregarding any further buffering using the other word units. A similar analysis may be applied that takes account of use of the other 3 word-units and delays for the purpose of filling the buffer. A time uncertainty of the data words' transitions in clock-domain A is known to be 0-1 ns after the clock A transition edges. During each clock B phase, a byte of data is read by clock-domain B. Assuming a data bus width of a single byte, it takes two clock B cycles to read an entire word unit, that is four bytes, from the synchronization FIFO.

As can be seen in FIG. 4, a 4 ns gap is obtained between the transition of a given word-unit data in the synchronization FIFO, derived from clock A, and the taking up of the corresponding word at region B. This gap is necessary to maintain data integrity in the presence of both jitter between clock A and clock B and also signal transfer skews between clock-domain A and clock-domain B.

Once the data is received, it is left to domain B to determine how the data is to be used, and in the preferred embodiment, domain B comprises logic to determine whether each word unit read from the synchronization FIFO is valid or not by examining the 'data-valid' bit accompanying that word, as will be explained below.

It will be appreciated from the above that synchronization is effectively maintained by the data transfer itself and resynchronization is needed only when the data stream has been interrupted. It is desirable to avoid unnecessary resynchronizations and to this end, a preferred embodiment allows the data stream to be maintained even when there is no data to transfer, simply by allowing blank or invalid data to be transferred. In the embodiment there is provided synchronization retention functionality 26. Synchronization retention functionality 26 preferably supports the process of adding blank data to the data stream, thereby extending the data stream and retaining validity of the initial synchronization. Blank data may be pseudorandomly generated, obtained from parts of the domain that always have data, or obtained in other ways known to the skilled person. The retention functionality arranges the data into a stream and sets control flags within the data stream to indicate that the current data is blank data or valid data. The flag comprises the "data-valid" bit referred to above.

Figure 5:
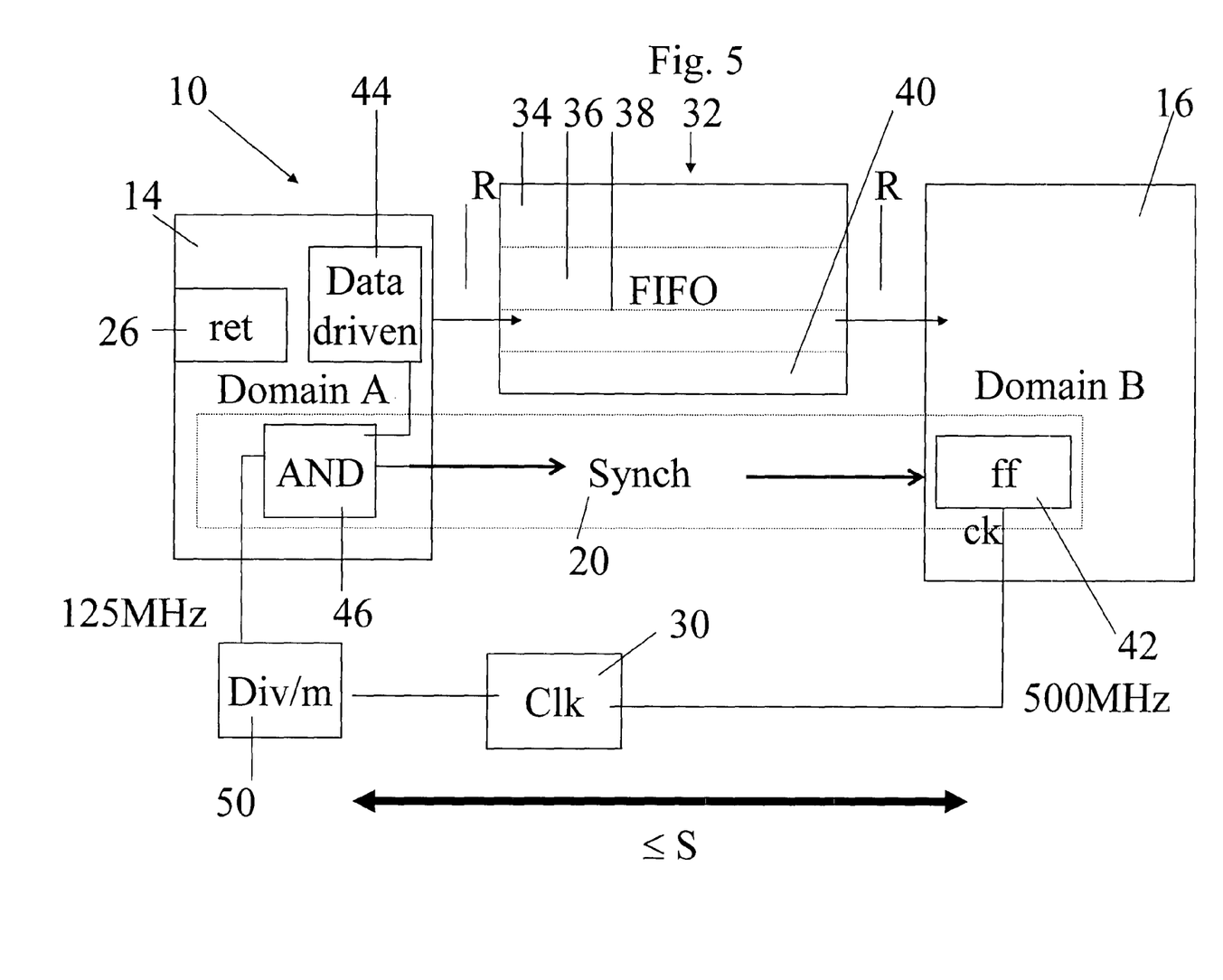
FIG. 5 is a simplified block diagram showing a variation of the embodiment of FIG. 3.

Reference is now made to FIG. 5, which is a simplified block diagram illustrating a variation of the embodiment of FIG. 3. Parts that are the same as in previous figures are given the same reference numerals and are not described again except to the extent necessary for an understanding of the present figure. A multiplier or divider 50 is placed between the output of the parent clock 30 and the domain being clocked, A or B, or of course one for each. In such a case use of buffering according to the present embodiments can be beneficial even if clock domains A and B are adjacent to each other. In a preferred embodiment the arrangement 10 is a single IC and the domains are simply relatively far apart domains or regions on the IC. Typically the kind of IC in which such synchronization issues apply is any chip with VLSI sizes, scales of feature density and clock rates. In other embodiments the arrangement 10 may comprise two or more IC's arranged together and clocked from a common originating clock signal, or the arrangement may consist of two or more IC's combined with other components.

It is appreciated that, whilst in the above embodiments the data originating clock domain, A, has provided the initial synchronization signal and the data receiving clock domain B has waited until the buffer has sufficient data, the invention is in no way so limited. Alternative embodiments include the receiving domain, B, starting data receiving substantially with detection of the synchronization signal, which is only issued when sufficient data has been output by A to the buffer. In a further embodiment, the waiting may be shared between each domain.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of transferring a multi-word data stream between a first electronic component region and a second electronic component region, said multi-word data stream having a start and a continuation, said component regions being clocked such as to have a frequency ratio therebetween variable about an average value, and a maximum mutual jitter between the two clocks the method comprising:
   outputting said start from said first component region,
   outputting a synchronization signal to indicate timing of outputting of said start,
   outputting said continuation from said first electronic component region at a first predetermined rate,
   buffering said data stream including said start and said continuation,
   using said synchronization signal to establish an initial synchronization with said second electronic component region,
   outputting said buffered start of said data stream to said second electronic component region in accordance with said initial synchronization, and
   outputting said continuation to said second electronic component region at substantially said first predetermined rate, at timings dictated by said initial synchronization.

2. The method of claim 1, wherein said outputting of said synchronization signal is substantially together with said outputting of said start.

3. The method of claim 1, wherein said outputting of said synchronization signal is delayed by a predetermined number of clock cycles following outputting of said start, said predetermined number being selected to allow at least partial filling of said buffer.

4. The method of claim 1, wherein said component regions are both clocked using signals derived from a single clock on a third electronic component region.

5. The method of claim 1, further comprising inserting blank data within said continuation to extend said continuation and retain validity of said initial synchronization.

6. The method of claim 5, comprising adding control flags to said data stream to indicate at least one of said blank data and valid data.

7. The method of claim 1, comprising deriving said synchronization signal from a clock signal of said first region.

8. The method of claim 7, wherein said using said synchronization signal to establish an initial synchronization comprises transferring said synchronization signal to said second region, waiting for a next rising or falling edge of a second region clock signal and issuing a synchronization acknowledge signal.

9. The method of claim 1, comprising waiting after said initial synchronization before said outputting of said buffered start, thereby to establish buffering margins to cover variations in synchronization between said first and said second regions.

10. The method of claim 9, wherein said buffering margins have a minimum length of said predetermined rate multiplied by a said maximum mutual jitter.

11. The method of claim 9, wherein said buffering margins are substantially equal in size to said predetermined rate multiplied by a said maximum mutual jitter.

12. The method of claim 1, wherein said first and said second electronic component regions are regions of a single integrated circuit.

13. The method of claim 1, wherein said first and said second electronic component regions are separate integrated circuits clocked from a common originating clock signal.

14. An arrangement comprising at least one integrated circuit, said arrangement being clocked by at least one signal obtained from a single clock having variable delays to different regions of said arrangement such that said regions are partially synchronized to each other, having a mutual clock frequency ratio therebetween which varies about an average value and a maximum mutual clock jitter, the arrangement comprising:
   a data transfer buffer for buffering parts of multi-word data streams during transfer between respective first and second ones of said regions, and
   data transfer control functionality, associated with said data transfer buffer and said respective regions, configured to control transfer of said data stream, said functionality comprising:
   synchronizing logic for detecting at least a start of transfer of said multi-word data stream, issuing a synchronizing signal based on timing at said first region, and using said synchronizing signal to form an initial synchronization with said second region, and
   rate control logic for receiving data of said multi-word data stream, in said buffer, from said first region, at a predetermined rate,
   said data transfer control functionality being operable to withhold forwarding of said data stream from said buffer to said second region by at least a synchronizing delay indicated by said initial synchronization, said rate control logic further being configured to carry out said forwarding to said second region at substantially said predetermined rate.

15. The arrangement of claim 14, wherein said first region comprises synchronization retention functionality to support insertion of blank data into said data stream to extend said data stream, thereby to retain validity of said initial synchronization.

16. The arrangement of claim 15, wherein said synchronization retention functionality comprises functionality to insert control flags into said data stream to indicate at least one of said blank data and valid data.

17. The arrangement of claim 14, wherein said initial synchronization comprises sending said synchronization signal from said first region to said second region simultaneously with outputting of a start of said data stream from said first region.

18. The arrangement of claim 14, wherein said data transfer buffer comprises a FIFO stack.

19. The arrangement of claim 14, wherein said first and said second regions are located on a single integrated circuit.

20. The arrangement of claim 19, wherein said single integrated circuit comprises very large scale integration (VLSI).

21. The arrangement of claim 14, wherein said synchronization signal is a derivation of a first region clock signal.

22. The arrangement of claim 21, wherein said synchronizing logic comprises logic associated with said second region for producing a synchronize acknowledgement at a first rising or falling edge of a second region clock signal following receipt of said synchronizing signal.

23. The arrangement of claim 22, wherein said buffer is configured to introduce a forwarding delay following receipt of said synchronize acknowledgement before forwarding said data stream to said second region.

24. The arrangement of claim 23, wherein said buffer comprises a plurality of buffer units to buffer variable amounts of data, said forwarding delay being selected to leave margins within said buffer both for transient increasing and decreasing of a buffer storage level, thereby to cushion transient changes due to a mutual clock jitter relationship between said regions.

25. The arrangement of claim 24, wherein said forwarding delay is selected such as to render said margins substantially equal in size.

26. The arrangement of claim 24, wherein said forwarding delay and a number of said buffer units are selected such as to provide a margin size at least equal to said predetermined rate multiplied by a maximum of said mutual clock jitter.

27. The arrangement of claim 24, wherein said forwarding delay and a number of said buffer units are selected such as to provide a margin size substantially equal to said predetermined rate multiplied by a maximum of said mutual clock jitter.

28. A method for transferring a stream of data between a first electronic component region and a second electronic component region the operation of which is phase-independent of the first electronic component region, said regions clocked from a commonly originating clock signal such that a clock frequency ratio variable about an average value is established between said regions, the method comprising:
  buffering said data stream received from said first region at a predetermined rate,
  initially synchronizing receipt of buffering output at the second region with phasing of a clock of said second region in response to a synchronization signal from the first region, and
  outputting said buffered data to said second region continually at said predetermined rate according to said initial synchronization.

* * * * *